3,067,049
REFRACTORY MATERIALS
Cyril Booth and Christopher Stelling Hedley, Worksop, and William Cecil Gilpin, West Hartlepool, England, assignors to The British Periclase Company Limited, Hartlepool, England, a British company
No Drawing. Filed Jan. 27, 1959, Ser. No. 789,254
10 Claims. (Cl. 106—62)

This invention is for improvements in or relating to refractory materials and has particular reference to the production of refractory magnesia clinkers which are suitable for making refractory bricks, shapes or the like. This application is a continuation-in-part of our earlier filed application Serial No. 485,282, now abandoned.

It is an object of the present invention to provide a special form of magnesia refractory which has improved resistance to spalling and shelling. Spalling is the fracture of refractory brick or block which may be due to any of the following causes:

(a) A temperature gradient in the brick, due to uneven heating or cooling, that is sufficient to set up stresses of such magnitude as to cause failure.
(b) Compression in a structure of refractories, due to expansion of the whole from a rise of temperature, sufficient to cause shear failures.
(c) Variation in coefficient of thermal expansion between the surface layer and the body of the brick, due to surface slag penetration or to a structural change in service, great enough to shear off the surface layer.

Shelling is the progressive loss of material in the form of slabs from the brick face when this is maintained at constant temperature and the brick subjected to a thermal gradient, i.e. the condition normally found in a furnace working under steady conditions.

According to the present invention there is provided a refractory magnesia clinker consisting essentially of magnesia, over 0.5% and up to 4% by weight of lime, a sufficient amount of silica to produce a molecular ratio of lime to silica not greater than 2 and a sufficient amount up to 31% by weight of alumina to produce a theoretical percentage weight of magnesium aluminate, at least twice the theoretical percentage weight of silicate present in the clinker and in which substantially all of the alumina is bound as magnesium aluminate.

In basic refractories of the kind with which the present invention deals, the refractory qualities reside in the magnesia and the aluminium oxide i.e. in the magnesia and the oxides which form spinels with magnesia. The other principal constituents of these refractories, which may occur in amounts of up to about 6%, are silica and lime and these combine together or with some of the magnesia to form a group of compounds known as silicates. The silicates are, in general, of relatively low refractoriness and it might be supposed, therefore, that magnesia and similar basic refractories should with advantage be made from the pure oxides. In fact, this is done only for specialist products such for example as electric spark plugs, small crucibles and thermocouple sheaths, which can command a high price. For bulk products of the kind used in the metallurgical, glass and cement industries and with which the present invention particularly deals, the large quantities required render the use of pure oxides impracticable and somewhat impure oxides, either in the form of natural ores or as the products of large scale chemical manufacture are used. Thus, for example, in the production of magnesia refractories, either deadburnt natural magnesite or sea water magnesia are commonly employed. Typical analyses of these materials are:

| | Deadburnt Natural Magnesite | Sea Water Magnesia |
|---|---|---|
| Loss on Ignition 1,000° C | | |
| Silica (as SiO$_2$) | 1.5 | 1.5 |
| Iron Oxide (as Fe$_2$O$_3$) | 5.0 | 1.5 |
| Aluminium Oxide (as Al$_2$O$_3$) | 0.7 | 0.7 |
| Chromium Sequioxide (as Cr$_2$O$_3$) | 0.2 | |
| Calcium Oxide (as CaO) | 2.5 | 2.5 |
| Magnesium Oxide (as MgO) | 90.1 | 93.8 |

The present invention includes a process for the production of refractory magnesia clinker of the type described which process comprises intimately mixing finely ground alumina with a slurry of magnesium hydroxide or of magnesium oxide derived from the calcination of natural magnesite and thereafter drying the mixture and calcining. The slurry of magnesium hydroxide may be prepared from calcined dolomite or calcined dolomite and sea water, or calcined limestone and sea water. Other brines of suitable composition may be substituted for sea water. Preferably the finely ground alumina is intimately mixed with the slurry in a ball mill.

The present invention also includes a refractory shape embodying magnesia clinker made in accordance with the present invention.

In arriving at the theoretical percentage weight of magnesium aluminate (MgO.Al$_2$O$_3$) it is assumed that all the alumina present in the clinker is combined as this mineral.

In arriving at the theoretical percentage weight of silicate mineral present in the clinker the method proposed by Rigby, Richardson and Ball (Transactions of the British Ceramic Society, 46,313, 1947) is used and it is assumed that, (1) When the molecular ratio of lime to silica is exactly 2.0 all the lime and silica are combined as dicalcium silicate (2CaO.SiO$_2$).

(2) When the molecular ratio of lime to silica is between 2.0 and 1.5 some of the lime and silica are combined as di-calcium silicate (2CaO.SiO$_2$) and the remainder of the lime and silica combined with magnesia as merwinite (3CaO.MgO.2SiO$_2$). The molecular proportion of each of these two minerals is obtained by solving the equation—

$$\frac{2}{3}(\alpha-x)+\frac{x}{2}=1$$

where $x$ is the molecular proportion of lime combined as dicalcium silicate and $\alpha$ is the molecular proportion of lime relative to silica equal to unity.

(3) When the molecular ratio of lime to silica is exactly 1.5 all the lime and silica are combined with magnesia as merwinite (3CaO.MgO.2SiO$_2$).

(4) When the molecular ratio of lime to silica is between 1.5 and 1.0 all the lime and silica are combined with magnesia to give a mixture of merwinite (3CaO.MgO.2SiO$_2$)

and monticellite ($CaO.MgO.SiO_2$). The proportion of each of these two minerals is obtained by solving the equation—

$$\tfrac{2}{3}(\alpha-x)+x=1$$

where $x$ is the molecular proportion of lime combined as monticellite and $\alpha$ is the molecular proportion of lime relative to silica equal to unity.

(5) When the molecular ratio of lime to silica is exactly 1.0 all the lime and silica are combined with magnesia as monticellite ($CaO.MgO.SiO_2$).

(6) When the molecular ratio of lime to silica is less than 1.0 all the lime is combined with magnesia and a portion of the silica as monticellite ($CaO.MgO.SiO_2$) and the remainder of the silica being combined with magnesia as forsterite ($2MgO.SiO_2$).

Following is a description by way of example of one method of carrying the present invention into effect in order to produce magnesia clinker for making refractory shapes.

The clinker was prepared from a slurry of magnesium hydroxide, produced from calcined dolomite and sea-water, the alumina being incorporated by means of a ball mill. The slurry had the following analysis:

| | Percent |
|---|---|
| Free moisture | 68.00 |
| Combined moisture | 10.25 |
| Silica ($SiO_2$) | 0.33 |
| Iron oxide ($Fe_2O_3$) | 0.304 |
| Alumina ($Al_2O_3$) | 0.176 |
| Lime (CaO) | 0.50 |
| Magnesia (MgO) | 20.50 |

The alumina contained more than 99.5% $Al_2O_3$, lime and silica being virtually absent. It was used in the form of a powder all passing through a 100 B.S. sieve.

160 lbs. of the slurry and 15 lbs. of the alumina were placed in the ball mill. Sufficient clean steel balls, 1½" in diameter, were also placed in the mill, so that they apparently occupied about ⅓ of its volume. The mill was run for 4 hours to ensure thorough mixing of the slurry and the powder. The mixed powder and slurry was then run into a clean steel drum and dried. Lumps of the dried material roughly 4" cube were calcined in an oil fired furnace at a temperature of 1600° C. for 4 hours.

The average apparent density of the finished clinker was 2.9 gms. per cc. and its chemical analysis was:

| | |
|---|---|
| Silica | 1.05 |
| Ferric oxide | 1.00 |
| Alumina | 30.5 |
| Lime | 1.6 |
| Magnesia | 65.85 |

The clinker was subjected to the following spalling and shelling tests:

*Spalling. Chesterslea prism test.*—A prism 3" x 2" x 2" was cut from the brick. This was placed in a furnace of adequate heat capacity for 10 minutes.

The specimen was removed, placed on a firebrick and allowed to cool in a relatively draught free atmosphere. This cycle was repeated until the specimen could be broken by hand.

This test is not a quantitative one unless a large number of tests are made, but it does distinguish between high and low spalling resistance.

*Shelling.*—The bricks to be tested were built into the wicket of a furnace, so arranged that there was no direct impingment of the flame. The face of the bricks was taken slowly up to 1600° C. so as to avoid thermal shock, and held for ten hours. The furnace was closed up and allowed to cool slowly. The bricks were then removed and a note made of cracks and shrinkage of the hot face. This cycle was repeated 3 times.

Following is a comparison of refractory bricks made in accordance with the present invention with a commercial Austrian brick:

| | Commercial Austrian Brick | Bricks made in accordance with the present invention | | | |
|---|---|---|---|---|---|
| | | (a) | (b) | (c) | (d) |
| Chemical Analysis: | | | | | |
| $SiO_2$ | 1.5 | 1.95 | 0.45 | 1.3 | 1.5 |
| $Fe_2O_3$ | 7.25 | 1.4 | 0.86 | 1.3 | 1.4 |
| $Al_2O_3$ | 1.20 | 31.0 | 30.95 | 24.5 | 17.0 |
| CaO | 2.4 | 1.6 | 1.46 | 2.25 | 2.25 |
| MgO | 87.65 | 64.05 | 66.28 | 70.65 | 77.85 |
| Specific Gravity | 3.60 | 3.55 | 3.58 | 3.55 | 3.55 |
| Porosity | 19.5 | 24.0 | 20.0 | 19.7 | 16.7 |
| Spalling index | 1 | 30+ | 30+ | 30+ | 25 |
| Refractories under load, 28 lbs./sq. in. maintained at 1,600° C. for 1 hour | [1] 6.5 | [1] 4.7 | [1] 3.5 | [1] 6.7 | [1] 7.1 |
| Shelling index | 1 | 3+ | 4+ | 3+ | 3+ |

[1] Percent subsidence.

We claim:

1. A process for the production of refractory magnesia clinker which process consists essentially of preparing an aqueous slurry of magnesium hydroxide which slurry contains silica, lime, and magnesia, thoroughly mixing the resultant aqueous slurry with from 17 to 31 percent by weight based on the weight of the resulting magnesia clinker of alumina, drying the resultant mixture and thereafter calcining it to produce magnesia clinker, in which all the alumina is bound as magnesium aluminate, the silica, lime and magnesia being present in the slurry to provide in the resulting magnesia clinker the following amounts:

| | Percent by weight |
|---|---|
| $SiO_2$ | 0.45 to 1.94 |
| CaO | 1.46 to 2.25 |
| MgO | 64.05 to 77.85 | the molecular ratio of lime to silica, in any particular case, being not greater than 2.

2. A process for the production of refractory magnesia clinker as claimed in claim 1 in which the slurry of magnesium hydroxide is prepared from calcined dolomite.

3. A process for the production of refractory magnesia clinker as claimed in claim 1 in which the slurry of magnesium hydroxide is prepared from calcined dolomite and sea-water.

4. A process for the production of refractory magnesia clinker as claimed in claim 1 in which the slurry of magnesium hydroxide is prepared from calcined limestone and sea-water.

5. A process for the production of refractory magnesia clinker consisting essentially of magnesia, silica, up to 31% by weight of alumina and from 0.5% up to 4% by weight of lime, the silica and alumina content being such that the molecular ratio of lime to silica is not greater than 2 and in which substantially all the alumina is bound as magnesium aluminate, the theoretical percentage weight of magnesium aluminate being at least twice the theoretical percentage weight of silicate present in the clinker, which process comprises intimately mixing finely ground alumina with a slurry of magnesium oxide derived from the calcination of natural magnesite and thereafter drying the mixture and calcining.

6. A process for the production of refractory magnesia clinker which process consists essentially of preparing an aqueous slurry of magnesium hydroxide from calcined dolomite and sea water, the slurry containing 20.5 parts of magnesia, 0.5 part of lime and 0.33 part of silica, thoroughly mixing 160 parts of the said slurry and 15 parts of finely ground alumina, drying the resultant mixture and thereafter calcining it to produce the magnesia clinker.

7. A process as claimed in claim 6 wherein small pieces of the dried mixture are calcined by heating at a temperature of approximately 1600° C. for approximately four hours.

8. A process as claimed in claim 6 wherein the aqueous slurry contains 78.25 parts of free and combined water.

9. A process for the production of refractory magnesia clinker which process consists essentially of preparing an aqueous slurry of magnesia which slurry contains silica, lime, and magnesia, thoroughly mixing the resultant aqueous slurry with from 17 to 31 percent by weight based on the weight of the resulting magnesia clinker of alumina, drying the resultant mixture and thereafter calcining it to produce magnesia clinker, in which all the alumina is bound as magnesium aluminate, the silica, lime and magnesia being present in the slurry to provide in the resulting magnesia clinker the following amounts:

| | Percent by weight |
|---|---|
| $SiO_2$ | 0.45 to 1.94 |
| CaO | 1.46 to 2.25 |
| MgO | 64.05 to 77.85 | the molecular ratio of lime to silica, in any particular case, being not greater than 2.

10. A process for the production of refractory magnesia clinker consisting essentially of magnesia, silica, up to 31% by weight of alumina and from 0.5% up to 4% by weight of lime, the silica and alumina content being such that the molecular ratio of lime to silica is not greater than 2 and in which substantially all the alumina is bound as magnesium aluminate, the theoretical percentage weight of magnesium aluminate being at least twice the theoretical percentage weight of silicate present in the clinker, which process comprises the steps of intimately mixing finely ground alumina with a slurry of magnesium hydroxide and thereafter drying the mixture and calcining the final mixture.

References Cited in the file of this patent

UNITED STATES PATENTS

| 2,218,485 | Seaton et al. | Oct. 15, 1940 |
| 2,280,517 | Ridgway et al. | Apr. 21, 1942 |
| 2,641,529 | Austin | June 9, 1953 |